Nov. 13, 1962 A. S. DE PAUL ET AL 3,064,152
DYNAMOELECTRIC MACHINE
Filed April 29, 1958 4 Sheets-Sheet 1

United States Patent Office 3,064,152
Patented Nov. 13, 1962

3,064,152
DYNAMOELECTRIC MACHINE
Alseno S. De Paul, Churchill, Ralph G. Gueck, Chalfont, and William H. Morse, Penn Hills Township, Allegheny County, Pa., assignors to Westinghouse Electric Corporation, East Pittsburgh, Pa., a corporation of Pennsylvania
Filed Apr. 29, 1958, Ser. No. 731,707
8 Claims. (Cl. 310—254)

This invention relates generally to dynamoelectric machines, and more particularly relates to the construction of electric motors and generators.

Many conventional constructions of dynamoelectric machines, particularly the larger sizes, necessitate high cost manufacturing operations. In these large machines the stator punchings are stacked in a frame cylinder or frame enclosure to form the stator core, which is a time consuming and difficult process because of the very confined space within the enclosure where the work must be done. The confined work space also makes it difficult to wind the machine.

The rotor member of the machine is rotatably supported by a pair of brackets mounted on the frame ends. To obtain proper alignment and concentricity of the rotor member with respect to the stator core, the brackets and the stator frame ends must be very accurately machined. The machining of the bracket fits and the frame ends must be accurately aligned with the large central bore through the stator punchings. Exact adjusting and positioning of the heavy frame cylinder is essential for the large boring mill operations necessary on the frame. The desired concentric air gap between the rotor and the stator core sometimes must be as small as 0.040 inch. Even after careful machining, a large number of dynamoelectric machines will be found to have eccentric air gaps requiring disassembly of the machine for reworking.

Another factor contributing to high cost is the lack of flexibility in the manufacturing of the stator member. The conventional stator member has most of its enclosure welded onto the stator frame or cast as an integral part of the frame. Not only does this interfere with stacking the stator punchings within the stator frame, but it also requires each frame to be specially made for a particular enclosure and application. It would be much more desirable to manufacture a standard stator frame for a number of different enclosures and applications. By separating the enclosure from the stator frame, a greater flexibility of the basic parts that make up the complete stator member is obtained. A standardized stator frame can receive a wide variety of enclosures and can be used with different rotating members to obtain different electrical and mechanical characteristics.

The principal object of our invention is to provide a construction for a dynamoelectric machine in which the expensive machining heretofore required has been eliminated and the desired air gap obtained in an inexpensive manner.

Another object of our invention is to provide a dynamoelectric machine providing for proper alignment of the rotor member independently of the stator member and proper alignment of the stator member independently of the base.

Another object of our invention is to provide a construction for a dynamoelectric machine in which the stator frame is separated from its enclosure at all points around the circumference of the stator core.

Another object of our invention is to provide a dynamoelectric machine with an enclosure affording a great degree of accessibility of the electrical components upon removal of the enclosure parts.

Another object of our invention is to provide a dynamoelectric machine with an enclosure means allowing easy access to the electrical leads without requiring an external conduit box.

Other objects and advantages of our invention will be more fully understood from the following detailed description, taken in connection with the accompanying drawings, in which:

FIG. 6 shows a side elevation view, partly in section, of the dynamoelectric machine embodying our invention.

Figure 1:
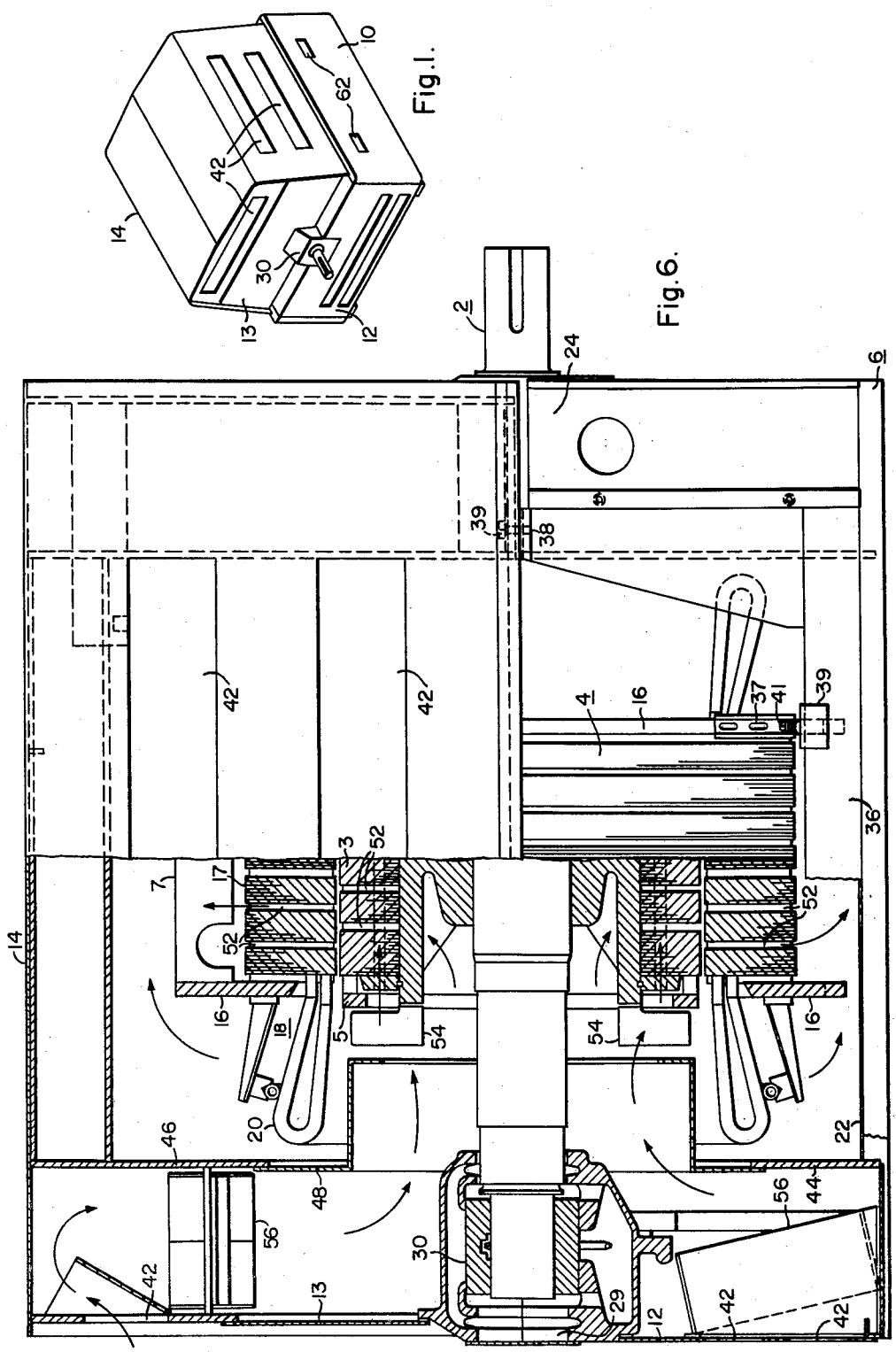
FIGURE 1 is a perspective view of a dynamoelectric machine embodying our invention.

The invention is generally applicable to any type of dynamoelectric machine, and is shown in the drawings embodied in an alternating current induction motor having a rotor 2, stator 4, base member 6 and bearing support members 8. The rotor 2 is illustrated as being of the squirrel cage type with a laminated rotor core 3 and rotor winding 5. The stator 4 has two frame rings 16 clamping together the stator core 17 made up of stator punchings and held by bars 7 which are preferably spaced away from the outer periphery of the stator core 17. The stator 4 carries the stator winding 18 with the coil ends shown at 20. The usual axial and radial ducts 52 in the rotor 2 and stator 4 provide passages for ventilation within the rotor and stator. Separate side covers 10, lower end covers 12, upper end covers 13 and an independently removable top cover 14 complete an enclosure for the induction motor illustrated.

As stated previously, conventional machines require very accurate and time consuming machining of the stator frame to establish a uniform air gap, which machining is not always entirely successful. Our invention virtually eliminates this difficult machining by supporting the rotor 2 and stator 4 independently of each other. The stator 4 is secured in place only after a proper air gap is established.

To accomplish the economical attainment of a proper air gap, the base member 6 plays an important role. The base member 6 consists of a base plate 22, preferably of generally rectangular configuration, with a generally vertical upright 24 adjacent each corner of the base plate 22. The vertical uprights 24 may be cast integral with the base plate 22 or may be fabricated structures secured at each corner of the base plate 22. Generally horizontal intermediate support members 36 on each side of the base plate 22 and extending between each pair of uprights 24 on each side of the base plate 22 complete the general configuration of the base member 6.

Figure 3:
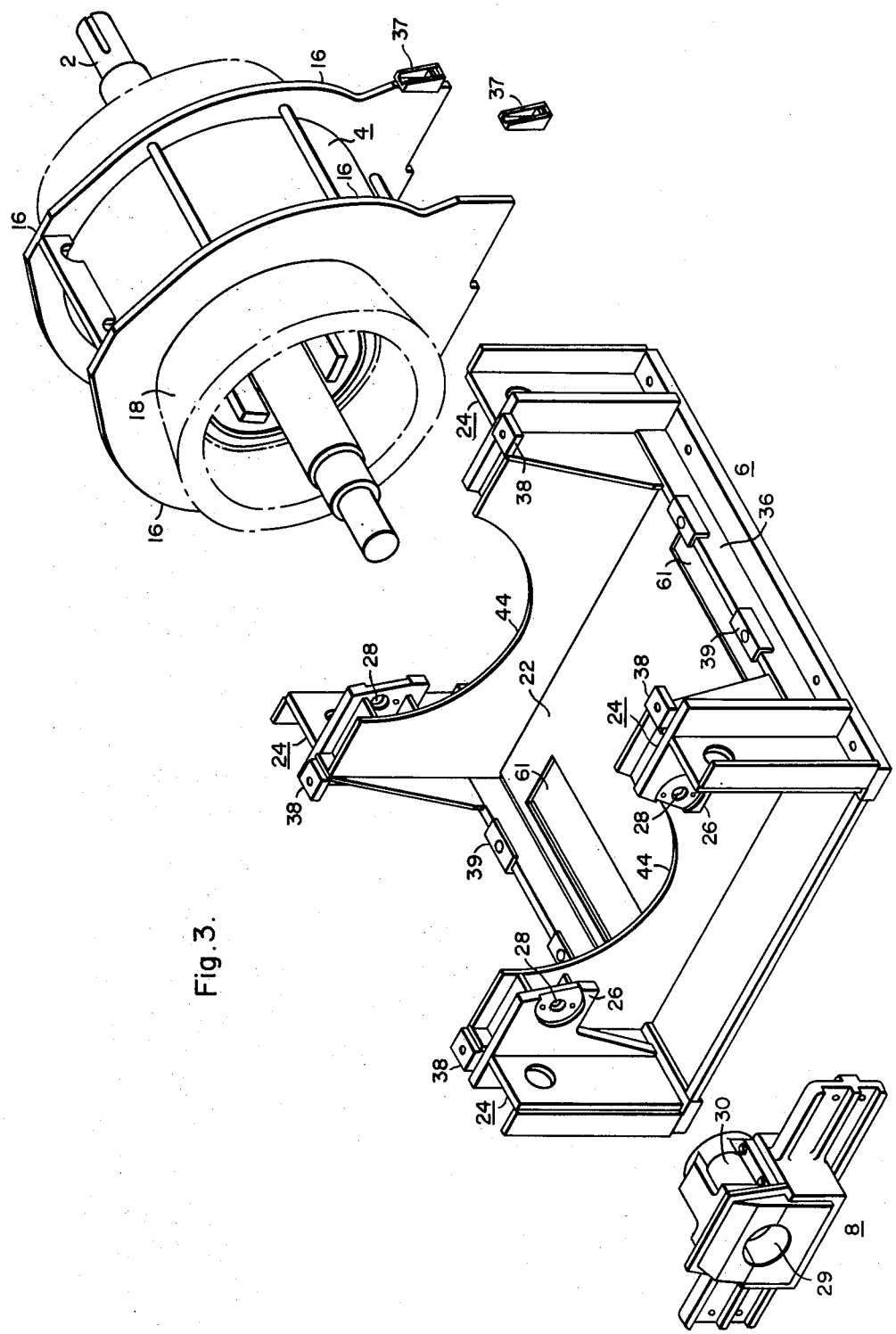
FIG. 3 is a further exploded perspective view of the dynamoelectric machine itself.

Each upright 24 is rigidly formed to receive and support a substantially horizontal bearing support member 8 at each end of the base plate 22. The bearing supports 8 may be mounted and supported on the uprights 24 by any suitable means that will accurately position them. More exactly, each bearing support member 8 has a centrally located bore 29 wherein is mounted a bearing 30 to rotatably receive the shaft of the rotor 2, and any suitable means that positions the bores 29 on a common axis substantially parallel to the base mounting plane, so that the rotor 2 will lie in a plane substantially parallel to the base mounting plane, may be used. One such means is shown in FIG. 3. An arm 26, shown integral with each upright 24, projects towards the opposite upright 24 on the same end of the base plate 22. Each arm 26 has a dowel opening 28 therein. The dowel opening 28 at one end is aligned with the dowel opening 28 on the same side at the opposite end of the base member 6 in such a way that the axes of both openings 28 lie in a substantially horizontal plane parallel to the base mounting plane. This alignment is easily accomplished by simultaneously machining the dowel openings 28 located on one side and then the other openings 28 on the other side of the base member 6. It is to be understood that any method of machining may be used to accomplish the desired results.

Figure 5:
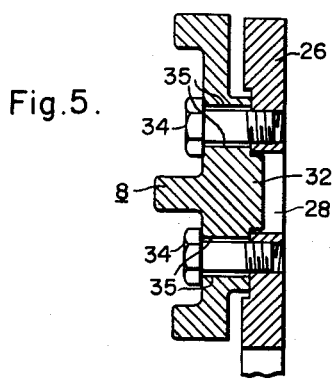
FIG. 5 is a somewhat enlarged fragmentary cross-sectional view of the support means taken along the line indicated by the arrows V—V in FIG. 4.

A large integral dowel pin 32 (FIG. 5) at each end of the bearing support member 8 is provided for insertion into the openings 28. The dowel pins 32 are located equidistantly from the centrally located bore 29 in each bearing support member 8. The dowel openings 28 are of slightly larger diameter than the dowel pins 32 so that upon insertion of a dowel pin 32 into an opening 28, the dowel pin 32 will find its own support generally near the bottom of the dowel opening 28. In this manner, the bearing support members 8 are positioned upon the base member 6. Proper alignment of the bores 29, and hence the bearings 30 and rotor 2, is insured since the centrally located bore 29 of each bearing support member 8 will be located on an axis substantially parallel to the base mounting plane of the base member 6. It is to be noted that any dismantling of the machine at a later date will not alter this alignment. The centrally located bearing bores 29 will always be located on a common axis substantially parallel to the base mounting plane.

Means are provided for securing the bearing supports 8 to the abutting arms 26. One such means is illustrated as bolts 34 which are allowed a given amount of play with respect to the bearing support members 8 as indicated by the clearances 35. The clearances 35 allow for a small margin of error between the dowel pins 32 and the dowel openings 28. The bolts 34 are threaded into the arms 26.

At the time of assembly of the machine, the rotor 2 is inserted into the stator 4 as shown in FIG. 3. The rotor 2 is accurately positioned by the bearing support members 8 as previously described. By axial adjustment of the bearings 30, the stator 4 is axially lined up with the rotor 2 so as to avoid end thrust. The proper length and concentricity of the air gap is attained through the use of feeler gauges inserted between the rotor 2 and stator 4 which measure and determine the air gap. Manipulation of the complete stator 4, by means of the stator frame rings 16, allows the positioning of the stator 4 with respect to the rotor 2 for a proper air gap. A proper air gap can be attained independently of the base member 6 since the stator 4 is free of the base member 6 during assembly and can assume any position necessary to be properly concentric with the rotor 2. The stator 4 is then rigidly secured to the base member 6. In this way, an accurate air gap is obtained without the expensive and difficult alignment of the large boring mill machining required in many conventional machines.

Any suitable means for rigidly securing the stator 4 to the base member 6 can be used. It is desirable, however, if the machine must later be disassembled for any reason, that the stator 4 of necessity assume the position formerly had on the base member 6, so that the air gap is again proper, upon reassembly of the machine. One suitable means for this purpose is shown in the drawings and is more fully described and claimed in a copending application of A. S. De Paul et al., Serial No. 738,796, filed May 29, 1958, now Patent No. 2,970,236, issued January 31, 1961. As disclosed therein four pairs of detachable securing members 37 and 39 cooperate to support the stator 4 on the intermediate support member 36. One member 37 of each pair is attached by welding, or otherwise, to the adjacent frame ring 16 and the other member 39, to the intermediate support member 36. The securing members are attached to their respective locations as indicated only after a proper air gap is established between the stator 4 and rotor 2. The securing members 37 and 39 cooperate in such a way that they will always assume the same position relative to each other after they have been attached. These securing members 37 and 39 are located near the bottom of each edge of the stator frame rings 16. Bolting means shown at 41 fasten the two securing members 37 and 39 together thereby securing the stator 4 to the base member 6.

If, at a later date, the stator 4 must be removed from the base member 6, the securing members 37 and 39 are unbolted at 41. Upon reassembly of the stator 4 to the base member 6, the securing members 37 and 39 assume the positions previously had relative to each other thereby once again correctly positioning the stator 4 with respect to the rotor 2 for a proper air gap.

Figure 2:
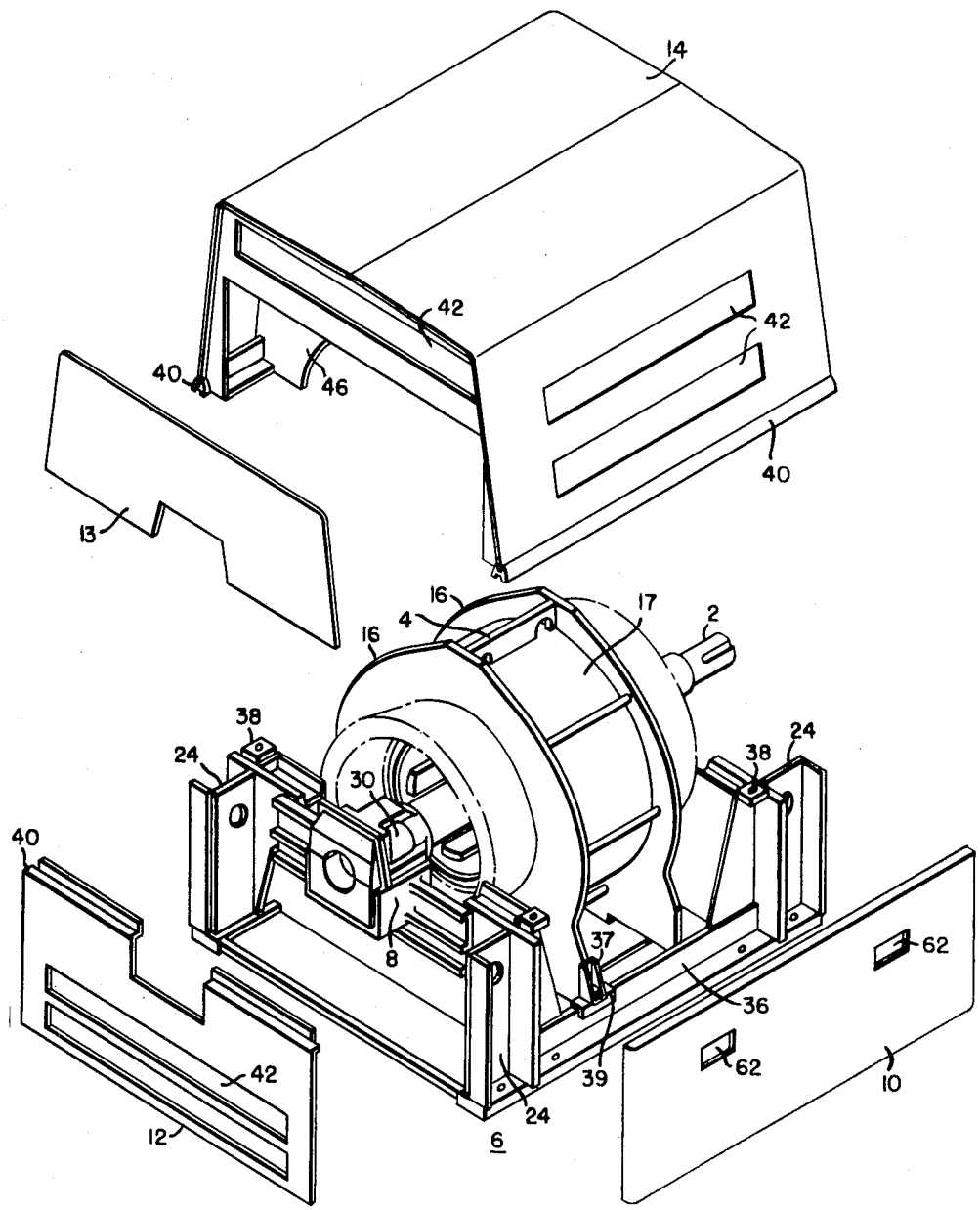
FIG. 2 is an exploded perspective view of the machine of FIG. 1 showing the machine and the enclosure.

It is to be noted that the stator core 17 is spaced away from the base member 6 at all points. The enclosure of the dynamoelectric machine is also spaced away from the stator core 17 at all points. The enclosure includes side covers 10 which may be bolted or spring-clipped to the uprights 24 located at each corner of the base member 6. Lower end covers 12 and upper end covers 13 are also secured to the vertical uprights 24. FIG. 2 shows end covers 12 and 13 at one end of the exploded perspective view and it is to be understood that like end covers 12 and 13 are used on the opposite end of the machine. The top cover 14 is secured to the uprights 24 by means herein shown as a threaded bolt 39 and a small mounting pad 38 located at each corner of the machine on the uprights 24. All the cover members are independently removable from the remainder of the enclosure. Rubber seals 40 are provided to seal the joints between adjacent covers as required. With all the covers in position about the base member 6 and stator 4, the dynamoelectric machine will have an outward appearance as shown in FIG. 1. The particular enclosure shown is for an open-type construction although it is to be understood that any desirable enclosure could be used. Upon removal of the covers the stator 4 is fully accessible for inspection and maintenance. The conventional construction of dynamoelectric machines with the housing integral with the stator restricted inspection to a view from the machine ends only.

Figure 4:
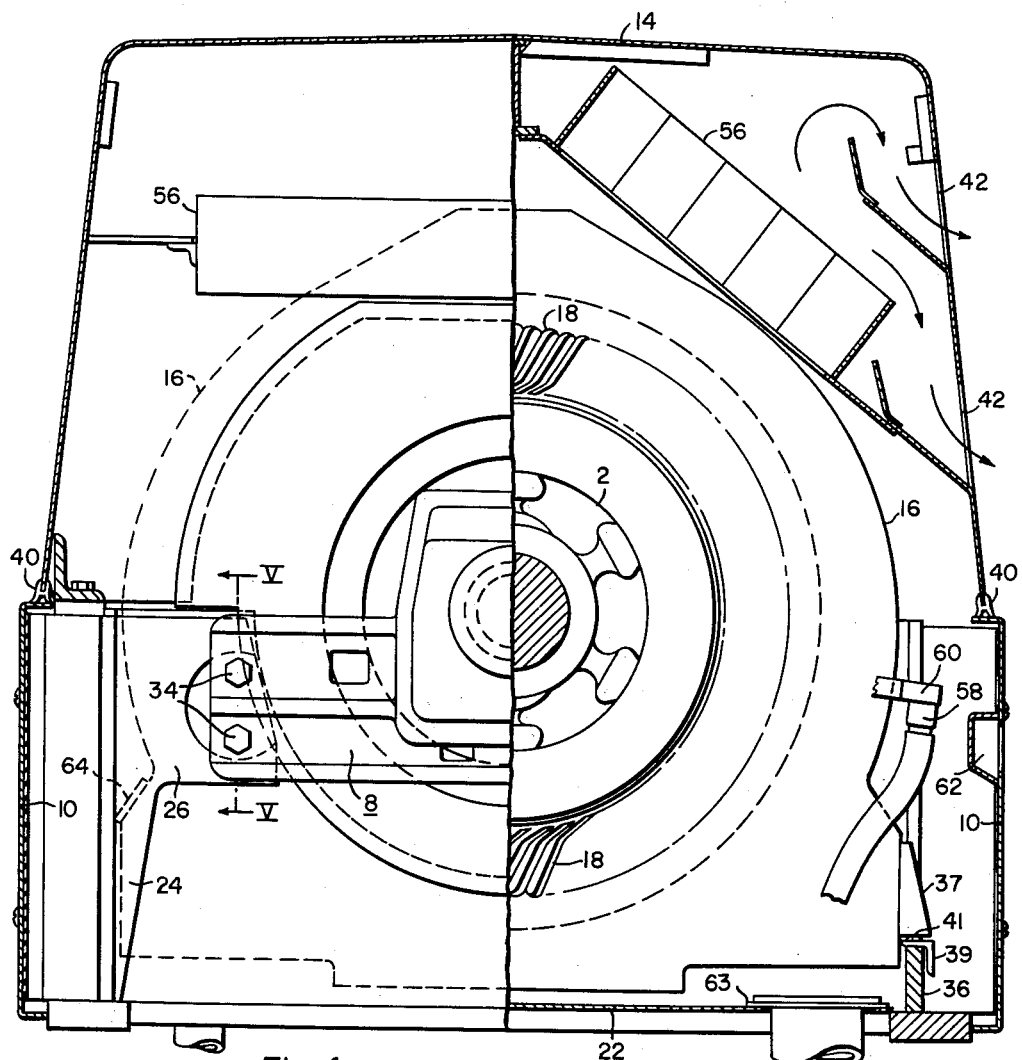
FIG. 4 is an end elevation view of the dynamoelectric machine, partly in section, embodying our invention.

Ventilating air enters and leaves the machine through large ventilating air openings 42 located in the top cover 14 and the lower end covers 12. The air flow is as indicated by the arrows in FIGS. 4 and 6, namely, the air entering through openings 42 at both ends of the enclosure and being discharged through the side openings 42 in the top cover 14. To accomplish this air flow, and also to provide for easy disassembly and reassembly of the machine, an air guidance construction is provided. This construction includes a baffle plate 44 located on the base member 6 at each end thereof. As seen in FIG. 3, the baffle plate 44 lies inward of and adjacent to each pair of uprights 24 at each end of the base member 6 and extends upward from the base plate 22. Each baffle plate 44 extends between the adjacent pair of uprights 24 at each end of the base member 6. The baffle plates 44 have a semicircular cutout portion intermediate the sides of the base member which cutout portion is preferably of slightly larger size than the radius of the rotor 2 to permit withdrawal of the rotor if necessary.

The baffle plate 44 has its counterpart or mate located in the top cover 14; namely, a baffle member 46 located adjacent each end to the top cover 14 and extending from side-to-side across the cover. Each baffle member 46 has a semicircular cutout portion intermediate the sides of the top cover 14 which is similar to the cutout portion of the baffle plates 44. Upon positioning the top cover 14 onto the base member 6, each baffle member 46 adjacent its associated end of the top cover 14 will lie in the same plane in juxtaposition with the baffle plate 44 on the same end of the base member 6. In such a way the baffle member 46 and the baffle plate 44 form a circular opening at each end of the dynamoelectric machine. It is through these two circular openings that the ventilating air is drawn as it enters through the lower end covers 12 and the end portions of the top cover 14.

Fan means 54, well known in the art, draw the ventilating air through each end of the machine and through the circular opening at each end formed by the baffle member 46 and the baffle plate 44. A generally cylindrical baffle 48 is mounted within each circular opening so as to direct the ventilating air into the inlet of the fan 54. The generally cylindrical baffle 48 insures substantially all of the ventilating air entering the internal recesses of the rotor 2 and the stator 4 by minimizing the air leakage which might flow radially between the baffle member 46 and the baffle plate 44 and the coil ends 20. The ventilating air flows through the usual axial and radial ducts 52 in the rotor core 3 and stator core and over the end turns 20 of the stator winding. Since the enclosure is spaced away from the stator 4 at all points, and the base member 6 is also spaced away from the stator core 17, ventilating air is freely discharged from the entire circumference of the stator core 17. The ventilating air is then exhausted from the machine enclosure through side openings 42 in the top cover 14.

Since the enclosure is entirely separate from the stator 4, the type of enclosure may be varied to meet a large variety of operational environments without changing the construction of the machine itself. The particular enclosure shown for the purpose of illustration protects the electrical parts of the dynamoelectric machine while allowing considerable latitude in the ventilating system.

Because the stator 4 is not attached to the enclosure parts, large areas of the enclosure are available for the addition of noise mufflers 56, if desired. Noise mufflers 56 can also be mounted on the ends of the machine behind the openings 42 as shown in FIG. 6. Filters for removal of contaminants from the ventilating air may also be mounted in these areas.

The separation of the enclosure from the stator 4 allows access to the stator leads 58 of the stator winding 18. The stator leads 58 are brought out of the stator frame to terminal means shown at 60. The side cover 10 has handholes 62 which allow the removal of the side cover 10 when access to the stator leads 58 is required. The necessity of an external conduit box is thus eliminated since the terminal connections are made within the enclosure with the power leads being brought up to the terminal board 60 through one of the large openings 61 in the base plate 22 at the bottom of the machine. A second terminal board 64 may be mounted between frame rings 16 at any convenient point for connection of bearing instruments, space heaters and other equipment when desired. The large openings 61 in the base plate 22 can also serve for the entrance and exit of power cables and auxiliary leads which may be required for the stator windings, space heaters, bearing temperature indicators and other like equipment. The remaining portion of each opening 61, not in use, may be covered by any suitable means shown as a plate 63.

While our invention has been described with a certain degree of particularity and certain preferred embodiments of the invention have been shown and described for the purpose of illustration, it is to be understood that the invention is not to be limited to these specific arrangements and that various modifications and other embodiments are possible within the scope of the invention.

We claim as our invention:

1. A dynamoelectric machine including a rotor, a stator, and a base member, said base member including a pair of generally vertical uprights adjacent each end of the base member, a baffle plate lying in a plane adjacent to each pair of uprights at each end of the base member and extending upward therefrom, each baffle plate extending between the adjacent pair of uprights, each baffle plate having a semicircular cutout portion intermediate the sides of the base member, a top removable cover, a plurality of independently removable side and end covers, said top cover having a baffle member adjacent each end of said cover extending from side-to-side across the cover, each baffle member having a semicircular cutout portion intermediate the sides of said top cover, each baffle member adjacent each end of said top cover lying in the same plane as said baffle plate on the same end of said base member and forming a circular opening therewith, baffle means mounted within each said circular opening for directing ventilating air into the stator and rotor, and means for drawing ventilating air through each circular opening and discharging the air radially through the stator and rotor, at least one of said covers having outlet openings located between the ends of the machine for the discharge of air.

2. A dynamoelectric machine including a stator, a rotor, and a rigid base member including a base plate having sides and ends, a generally vertical upright adjacent each corner of the base plate, a horizontal support member on the base plate extending between each pair of uprights on each side, a baffle plate at each end of said base plate lying in a plane adjacent to the pair of uprights at each end of the base plate and extending upward therefrom, each baffle plate extending between the adjacent pair of uprights, each baffle plate having a semicircular cutput portion intermediate the sides of the base plate, an arm on each upright projecting towards the opposite upright on the same end of the base plate, each of said arms having a dowel opening, the dowel opening at one end being aligned with the dowel opening on the same side at the opposite end of the base member so that the axis of each opening lies in a substantially horizontal plane parallel to the base mounting plane, a generally horizontal bearing support extending between and abutting each pair of arms on each end of the base plate, each bearing support having an integral dowel pin at each end thereof inserted into the dowel opening in the adjacent arm, means for securing said bearing supports to the abutting arms of said uprights, removable side and end covers attached to the base member, an independently removable top cover supported by said base member, all said covers being spaced away from the stator at all points, said top cover having at least one air outlet opening between the ends of the machine, said top cover having a baffle member adjacent each end of said cover extending from side-to-side across the cover, each baffle member having a semicircular cutout portion intermediate the sides of the cover, each baffle member adjacent each end of said cover lying in the same plane as said baffle plate on the same end of said base plate and forming a circular opening therewith, a cylindrical baffle mounted within each circular opening, and means for drawing ventilating air through each end of said machine and completely discharging the ventilating air radially through the stator and rotor to the spaced areas adjacent the stator formed by the top and side covers and through said air outlet openings.

3. A method of assembling a dynamoelectric machine comprising removably mounting bearing members in accurately aligned position on a unitary base member, inserting a rotor member into a stator member, placing the rotor and stator members on the base member with the rotor member supported in the bearing members, adjusting the stator member on the base member to accurately position the stator member with respect to the rotor member, and thereafter securing the stator member rigidly to the base member by detachable securing means adapted to accurately and reproducibly position the stator member in its adjusted position with respect to the base member.

4. A method of assembling a dynamoelectric machine comprising removably mounting bearing members in accurately aligned position on a unitary base member, inserting a rotor member into a stator member, placing the rotor and stator members on the base member with the rotor member supported in the bearing members, adjusting the stator member on the base member to accurately position the stator member with respect to the rotor member, securing the stator member rigidly to the base member by detachable securing means adapted to accurately and reproducibly position the stator member in its adjusted position with respect to the base member, and mounting a plurality of housing members directly on the base member, said housing members cooperating to form a complete housing for the machine.

5. A dynamoelectric machine having a unitary base member, upright members at each end of the base member, a generally horizontal bearing support member supported on the upright members at each end of the base member, interengaging dowel means on the upright members and the bearing support members for positioning the bearing support members in accurately predetermined horizontal and vertical positions with respect to the base member and each other, means for removably securing the bearing support members to the upright members, bearings on the bearing support members, a rotor member supported in said bearings, a stator member including a stator core carrying windings, means for accurately positioning the stator member on the base member in predetermined relation to the rotor member and for detachably securing the stator member to the base member independently of the rotor member, and housing means supported on the base member independently of the stator member.

6. A dynamoelectric machine having a unitary base member, upright members at each end of the base member, a generally horizontal bearing support member supported on the upright members at each end of the base member, interengaging dowel means on the upright members and the bearing support members for positioning the bearing support members in accurately predetermined horizontal and vertical positions with respect to the base member and each other, means for removably securing the bearing support members to the upright members, bearings on the bearing support members, a rotor member supported in said bearings, a stator member including a stator core carrying windings, securing means for the stator member including cooperating elements attached to the stator member and to the base respectively and adapted to accurately position the stator member in a predetermined adjusted position with respect to the rotor member, means for removably securing said cooperating elements together, and housing means removably supported on the base member independently of the stator member.

7. A dynamoelectric machine having a unitary base member, a generally horizontal bearing support member disposed adjacent each end of the base member, cooperating means on the bearing support members and on the base member for accurately positioning the bearing support members horizontally and vertically with respect to the base member and for removably securing the bearing support members thereto, bearings on the bearing support members, a rotor member supported in said bearings, a stator member including a stator core carrying windings, means for accurately positioning the stator member on the base member in a predetermined adjusted position with respect to the rotor member and for detachably securing the stator member to the base member independently of the rotor member, a top housing member supported on the base member and enclosing the upper part of the machine, an end housing member supported on the base member at each end of the machine, and side housing members supported on the base member at each side of the machine, said top, end and side housing members cooperating to form a housing for the machine, the housing members being separately supported on the base member independently of each other and being individually removable.

8. A dynamoelectric machine having a unitary base member, upright members at each end of the base member, a generally horizontal bearing support member supported on the upright members at each end of the base member, interengaging dowel means on the upright members and the bearing support members for positioning the bearing support members in accurately predetermined horizontal and vertical positions with respect to the base member and each other, means for removably securing the bearing support members to the upright members, bearings on the bearing support members, a rotor member supported in said bearings, a stator member including a stator core carrying windings, securing means for the stator member including cooperating elements attached to the stator member and to the base respectively and adapted to accurately position the stator member in a predetermined adjusted position with respect to the rotor member, means for removably securing said cooperating elements together, a top housing member supported on the base member and enclosing the upper part of the machine, an end housing member supported on the base member at each end of the machine, and side housing members supported on the base member at each side of the machine, said top, end and side housing members cooperating to form a housing for the machine, the housing members being separately supported on the base member independently of each other and being individually removable.

References Cited in the file of this patent

UNITED STATES PATENTS

| | | |
|---|---|---|
| 631,518 | Burke | Aug. 22, 1899 |
| 763,845 | Bohmlander | June 28, 1904 |
| 1,185,366 | Burke | May 30, 1916 |
| 1,301,845 | Hellmund | Apr. 29, 1919 |
| 2,284,656 | Heter | June 2, 1942 |
| 2,399,366 | Lynn | Apr. 30, 1946 |
| 2,456,612 | Baudry | Dec. 21, 1948 |
| 2,777,079 | Egglestone | Jan. 8, 1957 |

FOREIGN PATENTS

| | | |
|---|---|---|
| 129,721 | France | Mar. 22, 1879 |
| 1,002,864 | Germany | Feb. 21, 1957 |